United States Patent
Park et al.

(10) Patent No.: US 8,754,806 B2
(45) Date of Patent: Jun. 17, 2014

(54) PULSE RADAR RECEIVER

(75) Inventors: Pil Jae Park, Daejeon (KR); Seong Do Kim, Daejeon (KR); Sung Chul Woo, Seoul (KR); Hyun Kyu Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 271 days.

(21) Appl. No.: 13/316,381

(22) Filed: Dec. 9, 2011

(65) Prior Publication Data

US 2012/0146852 A1    Jun. 14, 2012

(30) Foreign Application Priority Data

Dec. 9, 2010 (KR) .................. 10-2010-0125810

(51) Int. Cl.
*G01S 7/285* (2006.01)
*G01S 7/00* (2006.01)
*G01S 13/10* (2006.01)

(52) U.S. Cl.
USPC .............. 342/175; 342/73; 342/89; 342/96; 342/102; 342/103; 342/118; 342/134; 342/135; 342/195

(58) Field of Classification Search
USPC ............. 342/21, 27, 28, 82, 89–103, 118, 342/128–145, 175, 195, 73; 341/126, 341/155–172
See application file for complete search history.

(56) References Cited

U.S. PATENT DOCUMENTS

| | | | |
|---|---|---|---|
| 4,490,720 A * | 12/1984 | Kuntman | 342/195 |
| 4,891,649 A * | 1/1990 | Labaar et al. | 342/175 |
| 5,805,110 A | 9/1998 | McEwan | |
| 6,208,286 B1 * | 3/2001 | Rostislavovich et al. | 342/195 |
| 6,300,897 B1 * | 10/2001 | Kielb | 342/82 |
| 6,317,074 B1 * | 11/2001 | Johnson | 342/82 |
| 6,801,153 B2 * | 10/2004 | Rauch et al. | 342/21 |
| 7,298,317 B2 * | 11/2007 | Charpentier et al. | 342/92 |
| 7,498,975 B2 * | 3/2009 | Ikeda | 342/175 |
| 7,545,306 B2 * | 6/2009 | Frederick et al. | 341/155 |
| 7,675,459 B2 | 3/2010 | Yoshimura | |
| 7,737,880 B2 * | 6/2010 | Vacanti | 342/100 |
| 8,319,678 B2 * | 11/2012 | Weiss | 342/175 |

OTHER PUBLICATIONS

Anh Tuan Phan, et al., "Low-Power Sliding Correlation CMOS UWB Pulsed Radar Receiver for Motion Detection", IEEE, 2009, pp. 1541-1544.

* cited by examiner

*Primary Examiner* — Bernarr Gregory

(57) ABSTRACT

A pulse radar receiver includes a power splitter configured to split a transmit (TX) trigger signal for generating a TX pulse, a phase-locked loop (PLL) configured to receive a division ratio and the TX trigger signal split by the power splitter, and generate a sampling frequency, and a sampler configured to sample a reflected wave received through an RX antenna, according to the sampling frequency generated by the PLL. Accordingly, it is possible to provide a high distance resolution by generating a sampling frequency with a difference from a TX pulse to sample a reflected wave received through an RX antenna. Thus, it is possible to overcome a limitation in the distance resolution due to the pulse width and to measure a minute movement at a short distance. Therefore, the pulse radar receiver is applicable to high range resolution radar applications such as a living body measuring radar.

4 Claims, 2 Drawing Sheets

PULSE RADAR RECEIVER

CROSS-REFERENCE TO RELATED APPLICATIONS

The present application claims priority to Korean patent application number 10-2010-0125810, filed on Dec. 9, 2010, which is incorporated by reference in its entirety.

BACKGROUND OF THE INVENTION

The present invention relates to a pulse radar receiver, and more particularly, to a pulse radar receiver that provides a high distance resolution by using a receive (ΔX) sampling frequency that has an adjustable offset frequency (Δf) from a transmit (TX) pulse repetition frequency (PRF) to sample a reflected wave received through a receive (RX) antenna.

In general, a radar (radio detection and ranging) is a sensor that detects the presence of an object beyond the limitations of a human visual range. A pulse radar includes a radar transmitter and a radar receiver. The radar transmitter transmits a TX pulse by at TX pulse repetition periods, and the radar receiver receives an echo signal of the TX pulse reflected from a target, thereby acquiring information about the position and size of the target.

Examples of the applications of such radar technology include military monitoring radars, automobile radars for a cruise control, and patient monitoring radars.

The technical configuration described above is provided to aid in understanding the present invention, and does not denote widely-known technology in the related art to which the present invention pertains.

SUMMARY OF THE INVENTION

Such a conventional pulse radar receiver determines the presence/absence of a pulse from one TX pulse and obtains a distance information from the time interval between the TX pulse and an RX pulse. Therefore, the conventional pulse radar receiver has a limitation in implementing a high resolution because a distance resolution is determined by a pulse width.

There is a receiving scheme that receives and measures a plurality of TX pulses in order to overcome such a limitation. In such a scheme, the receiving scheme may have a high signal-to-noise ratio (SNR) in an RX pulse, but still there is a limitation in implementing a high resolution.

In a range gating scheme, a radar receiver with a time delay element is provided to receive reflected pulses in a certain time window after a time delay, thereby determining the presence/absence of a target in a predetermined range (i.e., predetermined time delay). However, the range gating scheme has a limitation in increasing the resolution of a range determined by a pulse width.

Embodiments of the present invention are directed to a pulse radar receiver that provides a high distance resolution by generating a sampling frequency with a difference from a TX pulse to sample a reflected wave received through an RX antenna.

In one embodiment, a pulse radar receiver includes: a power splitter configured to split a transmit (TX) trigger signal for generating a TX pulse; a phase-locked loop (PLL) configured to receive a division ratio and the TX trigger signal split by the power splitter, and generate a sampling frequency; and a sampler configured to sample a reflected wave received through an RX antenna, according to the sampling frequency generated by the PLL.

In the present invention, the PLL may include a key input unit configured to receive the division ratio.

In the present invention, the pulse radar receiver may further include a low noise amplifier (LNA) configured to amplify the reflected wave received through the RX antenna.

In the present invention, the sampler may include an analog-to-digital converter (ADC).

DESCRIPTION OF SPECIFIC EMBODIMENTS

Hereinafter, a pulse radar receiver in accordance with the present invention will be described in detail with reference to the accompanying drawings. Herein, the drawings may be exaggerated in thicknesses of lines or sizes of components for the sake of convenience and clarity in description. Furthermore, terms used herein are defined in consideration of functions in the present invention and may be varied according to the custom or intention of users of operators. Thus, definition of such terms should be determined according to overall disclosures set forth herein.

Figure 1:
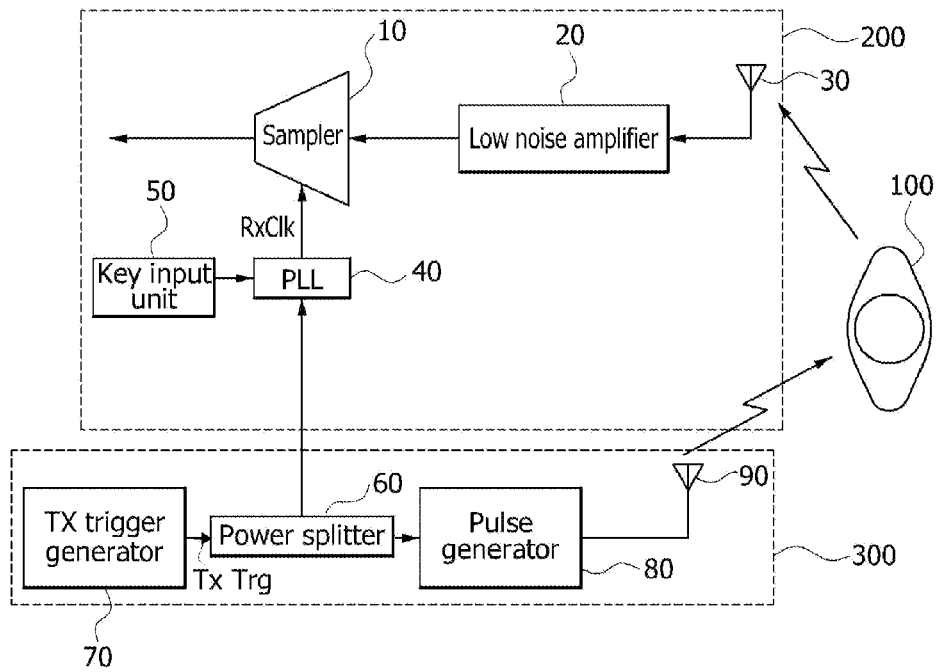
FIG. 1 is a block diagram of a pulse radar receiver according to an embodiment of the present invention.
Figure 2:
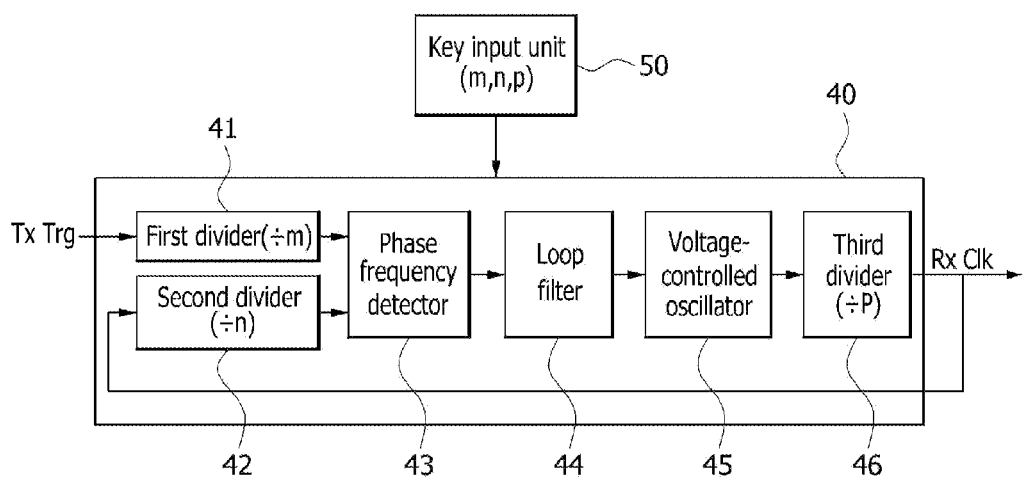
FIG. 2 is a block diagram of a phase-locked loop (PLL) of a pulse radar receiver according to an embodiment of the present invention.

FIG. 1 is a block diagram of a pulse radar receiver according to an embodiment of the present invention. FIG. 2 is a block diagram of a phase-locked loop (PLL) of a pulse radar receiver according to an embodiment of the present invention.

As illustrated in FIG. 1, a pulse radar receiver according to an embodiment of the present invention includes a power splitter 60, a phase-locked loop (PLL) 40, and a sampler 10.

A TX trigger generator 70 is configured to generate a TX trigger signal TX Trg. A pulse generator 80 is configured to receive the TX trigger signal TX Trg and generate a TX pulse according to the TX trigger signal TX Trg. The power splitter 60 is configured to split the TX trigger signal TX Trg which is provided from the TX trigger generator 70 to the pulse generator 80 and output the resulting signal to the PLL 40 as a reference signal.

The PLL 40 receives the TX trigger signal TX Trg divided by the power splitter 60 and a division ratio (m,n,p but not limited to three input values) inputted by a user through a key input unit 50, and generates a sampling frequency RX Clk for sampling an RX pulses.

As illustrated in FIG. 2, the PLL 40 includes first to third dividers 41, 42 and 46, and a phase frequency detector (PFD) 43, a loop filter 44, and a voltage-controlled oscillator 45. However, the present invention is not limited to such a PLL structure and may be applicable to any structure that can generate a sampling frequency RX Clk with a difference Δf from a TX pulse repetition frequency (PRF).

The PLL 40 constructs a feedback loop to construct a phase-locked loop with respect to a TX trigger signal TX Trg that is an input signal.

The PLL 40 receives a division ratio (m,n,p) through the key input unit 50, receives a TX trigger signal TX Trg from the power splitter 60, and generates a sampling frequency RX Clk with a difference Δf from a TX pulse repetition frequency (PRF). Herein, the difference Δf may be set by the user through the division ratio (m,n,p).

For example, if the voltage-controlled oscillator 45 has an oscillation frequency of 100 MHz and the first to third dividers 41, 42 and 46 receive inputs m, n and p of 5000, 4999 and 10, when the TX trigger signal TX Trg generated by the TX trigger generator 70 has a frequency of 10 MHz, the sampling frequency RX Clk generated by the PLL 40 has a difference of 2 kHz from the TX pulse. This means a period difference is about 20 psec between the sampling frequency RX Clk and the TX pulse repetition period (PRF) in the time domain, and the period difference corresponds to a distance resolution of 6 mm.

The sampler 10 includes an analog-to-digital converter (ADC) to sample a reflected wave received through an RX antenna 30, according to the sampling frequency RXClk generated by the PLL 40.

The pulse radar receiver may further include a low noise amplifier 20 configured to amplify a reflected wave received through the RX antenna 30.

An operation of the pulse radar receiver is described below in detail.

First, when a pulse transmitter 300 of the pulse radar transmits a TX pulse to a target 100, a pulse receiver 200 receives a reflected wave from the target 100 to acquire the position and displacement information of the target 100.

Specifically, the pulse transmitter 300 generates a TX pulse with the same frequency (i.e., pulse repetition frequency) as the TX trigger signal TX Trg by the pulse generator 80, which received the TX trigger signal TX Trg generated by the TX trigger generator 70, and transmits the generated TX pulse through a TX antenna 90 to the target 100.

A reflected wave reflected from the target 100 is received by the pulse receiver 200 at short intervals to acquire the position and displacement information of the target 100.

The pulse receiver 200 receives a reflected wave through the RX antenna 30, amplifies the received reflected wave by the low noise amplifier 20, converts the amplified signal into a digital signal by the sampler 10, and performs a digital signal processing operation thereof.

Herein, the sampling frequency RX Clk for sampling an RX pulse from a plurality of received reflected waves may be generated by the PLL 40 with a difference $\Delta f$ ($\Delta t$ in the time domain) from the TX pulse repetition frequency (PRF), thereby making it possible to receive the pulse at short intervals (i.e., at a high distance resolution).

The PLL 40 generates the sampling frequency RX Clk with a difference $\Delta f$ from the TX pulse repetition frequency (PRF) by receiving the TX trigger signal TX Trg, generated by the TX trigger generator 70 by defining the division ratio (m,n,p) through the key input unit 50 by a user, through the power splitter 60.

For example, when the target 10 is a stationary person and a displacement of 3 cm is generated from the body at periods of breath, if a 10 MHz TX trigger signal TX Trg is generated by the TX trigger generator 70, a TX pulse with a pulse width of 0.5 nsec is transmitted to the target 100 at periods of 100 nsec.

If the voltage-controlled oscillator 45 has an oscillation frequency of 100 MHz and the first to third dividers 41, 42 and 46 receive division ratios m, n and p of 5000, 4999 and 10, the PLL 40 of the pulse receiver 200 outputs the sampling frequency RX Clk with a difference of 2 KHz from the TX pulse repetition frequency (PRF) to the sampler 10 to generate the RX pulse.

This means a period difference of about 20 psec in the time domain and the period difference corresponds to a distance resolution of 6 mm. Therefore, a breath displacement 3 cm can be measured.

Figure 3:
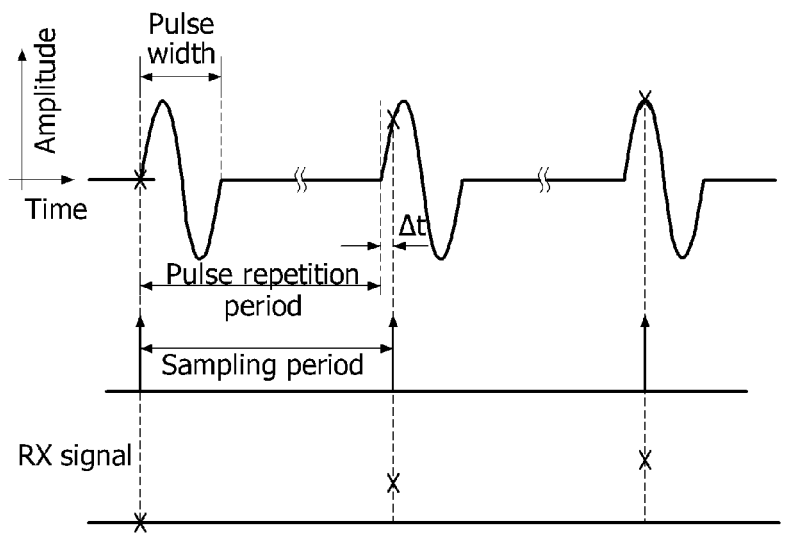
FIG. 3 is a graph illustrating a principle for receiving a signal through a pulse radar receiver according to an embodiment of the present invention.

FIG. 3 is a graph illustrating a principle for receiving a signal through a pulse radar receiver according to an embodiment of the present invention.

As illustrated in FIG. 3, a TX pulse generated by the pulse generator 80 is reflected by the target 100 spaced apart by a predetermined distance therefrom and is received by the RX antenna 30 with amplitude attenuation. The reflected wave is amplified by the low noise amplifier 20 of the pulse receiver 200 and the resulting signal is inputted to the sampler 10.

The reflected wave, reflected by the stationary target 100 and processed through the RX antenna 30 and the low noise amplifier 20, has a pulse repetition period (a reciprocal of the TX pulse repetition frequency) and a certain amplitude. Although this embodiment has illustrated the case of not considering a noise because of a sufficient SNR, the present invention is similarly applicable to the case of the presence of a noise.

Also, the sampling frequency RX Clk may be set by the PLL 40 and may be set to have a difference $\Delta f$ from the TX pulse repetition frequency (PRF). That is, since a time difference $\Delta t$ can be set between the pulse repetition period and the sampling period, the original pulse can be recovered from an RX signal sampled from a plurality of TX pulses. That is, the pulse width of an RX pulse recovered by sampling becomes larger than the pulse width of the TX pulse.

In a quantitative respect, an acquisition time corresponding to "Sampling Period×(Pulse Repetition Period÷$\Delta t$)" is necessary to receive a single pulse period. Since the acquisition time and the pulse repetition period are known values, a pulse can be calculated from the sampled received pulse in the original time axis (pulse width).

In the case of the moving target 100, it is assumed that there is no difference between a plurality of received reflected waves due to the target movement. This is a valid assumption, because the acquisition time for receiving one pulse repetition period is sufficiently short compare to the target movement.

For example, if the target 100 moving at a velocity of 1 m per second is received at a resolution of 1 cm (33.3 psec) by a signal with a 10 MHz pulse repetition frequency (a 100 nsec period), about 3000 times (100 n/33.3 psec) of reflected waves are necessary to recover one period. During this period (100 n×3000=300 psec), because the target 100 moves by 0.3 mm, much smaller 1/30 than a resolution can be received with a distance resolution.

As described above, the present invention can provide a high distance resolution by generating a sampling frequency with a difference from a TX pulse to sample a reflected wave received through an RX antenna. Thus, the present invention makes it possible to overcome a limitation in the distance resolution due to the pulse width and to measure a minute movement at a short distance. Therefore, the present invention is applicable to high range resolution radar applications such as a living body measuring radar.

While the present invention has been described with respect to the specific embodiments, it will be apparent to those skilled in the art that various changes and modifications may be made without departing from the spirit and scope of the invention as defined in the following claims.

What is claimed is:

1. A pulse radar receiver comprising:
    a power splitter configured to split a transmit (TX) trigger signal for generating a TX pulse;
    a phase-locked loop (PLL) configured to receive a division ratio and the TX trigger signal split by the power splitter, and generate a sampling frequency; and a sampler configured to sample a reflected wave received through an RX antenna, according to the sampling frequency generated by the PLL.

2. The pulse radar receiver of claim 1, wherein the PLL comprises a key input unit configured to receive the division ratio.

3. The pulse radar receiver of claim 1, further comprising a low noise amplifier (LNA) configured to amplify the reflected wave received through the RX antenna.

4. The pulse radar receiver of claim 1, wherein the sampler comprises an analog-to-digital converter (ADC).

* * * * *